| (12) | United States Patent | (10) Patent No.: | US 10,066,356 B2 |
|---|---|---|---|
| | Buckner | (45) Date of Patent: | *Sep. 4, 2018 |

(54) SYSTEM TO MANUFACTURE NATIVE SOILS FLOWABLE FILL AND RELATED METHODS

(71) Applicant: VAC-TRON EQUIPMENT, LLC, Okahumpka, FL (US)

(72) Inventor: Don M. Buckner, Okahumpka, FL (US)

(73) Assignee: VAC-TRON EQUIPMENT, LLC, Okahumpka, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,575

(22) Filed: Jan. 31, 2017

(65) Prior Publication Data

US 2017/0138011 A1 May 18, 2017

Related U.S. Application Data

(63) Continuation of application No. 14/817,354, filed on Aug. 4, 2015, now Pat. No. 9,593,457.

(60) Provisional application No. 62/032,753, filed on Aug. 4, 2014.

(51) Int. Cl.
*E02D 3/00* (2006.01)
*E02F 3/92* (2006.01)
(Continued)

(52) U.S. Cl.
CPC .............. *E02D 5/36* (2013.01); *B01F 3/1221* (2013.01); *B01F 3/18* (2013.01); *B01F 7/00291* (2013.01); *B01F 7/00641* (2013.01); *B01F 7/041* (2013.01); *C04B 14/361* (2013.01); *C04B 28/04* (2013.01); *C09K 17/10* (2013.01); *E02D 3/00* (2013.01); *E02D 15/04* (2013.01);
(Continued)

(58) Field of Classification Search
CPC ....... B09C 1/02; B09C 2101/00; E02D 3/005; E02F 3/925; C09K 17/00; C09K 17/08; C09K 17/10
See application file for complete search history.

(56) References Cited

U.S. PATENT DOCUMENTS 4,050,258 A 9/1977 Brewer
4,050,261 A 9/1977 Brewer
(Continued)

FOREIGN PATENT DOCUMENTS

JP H11-158913 A 6/1999
KR 2003024345 3/2003

*Primary Examiner* — Frederick L Lagman
(74) *Attorney, Agent, or Firm* — Matthew G. McKinney, Esq.

(57) ABSTRACT

A method to manufacture a native soil flowable fill includes hydro excavating native soil to form a hole at a first excavation, transferring the native soil from the first excavation to a debris tank, and adding a pozzolan component, cement and water to the debris tank. The method also includes mixing the native soil in the debris tank using a mixing apparatus to form the native soil flowable fill, and transferring the native soil flowable fill back to the first excavation into the hole. The native soil flowable fill comprises 30-90% by weight of native soil, 0-50% by weight of the added pozzolan component, 0-50% by weight of the cement, and 10-45% by weight of the water.

12 Claims, 2 Drawing Sheets

(51) Int. Cl.
  *C09K 17/08* (2006.01)
  *C09K 17/10* (2006.01)
  *E02D 15/04* (2006.01)
  *E02D 5/36* (2006.01)
  *B01F 3/12* (2006.01)
  *B01F 3/18* (2006.01)
  *B01F 7/00* (2006.01)
  *B01F 7/04* (2006.01)
  *C04B 28/04* (2006.01)
  *C04B 14/36* (2006.01)
  *C04B 111/00* (2006.01)

(52) U.S. Cl.
  CPC ........... *B01F 2215/0047* (2013.01); *B01F 2215/0083* (2013.01); *C04B 2111/00663* (2013.01); *C04B 2111/00706* (2013.01); *E02D 2250/0023* (2013.01); *E02D 2300/0018* (2013.01)

(56) References Cited

U.S. PATENT DOCUMENTS

| | | |
|---|---|---|
| 4,050,950 A | 9/1977 | Brewer |
| 4,134,862 A | 1/1979 | Eden |
| 4,329,090 A | 5/1982 | Teague |
| 4,844,807 A | 7/1989 | Manchak, Jr. |
| 5,106,422 A | 4/1992 | Bennett |
| 5,535,836 A | 7/1996 | Cagianut |
| 5,887,667 A | 3/1999 | Van Zante |
| 5,951,751 A | 9/1999 | Williams et al. |
| 6,000,151 A | 12/1999 | Hayes |
| 6,042,305 A | 3/2000 | Novich |
| 6,470,605 B1 | 10/2002 | Gilman |
| 6,484,422 B1 | 11/2002 | Bain |
| 6,615,849 B1 | 9/2003 | Gilman |
| 7,234,252 B2 | 6/2007 | Jarnecke |
| 7,344,592 B2 | 3/2008 | Setliff et al. |
| 7,381,177 B2 | 6/2008 | Johnson et al. |
| 7,484,322 B2 | 2/2009 | Maybury, Jr. |
| 7,581,903 B1 | 9/2009 | Scola |
| 7,743,537 B2 | 6/2010 | Maybury, Jr. |
| 8,336,231 B2 | 12/2012 | Maybury, Jr. |
| 8,360,260 B2 | 1/2013 | Maybury, Jr. |
| 9,103,091 B2 | 8/2015 | Buckner |
| 9,593,457 B2 * | 3/2017 | Buckner ............... E02D 5/36 |
| 2006/0086010 A1 | 4/2006 | Jarnecke et al. |
| 2006/0117612 A1 | 6/2006 | Maybury, Jr. et al. |
| 2009/0185865 A1 | 7/2009 | Sharp |
| 2010/0196104 A1 | 8/2010 | Constantz et al. |
| 2013/0340297 A1 | 12/2013 | Buckner |
| 2014/0020268 A1 | 1/2014 | Buckner |

* cited by examiner

SYSTEM TO MANUFACTURE NATIVE SOILS FLOWABLE FILL AND RELATED METHODS

CROSS-REFERENCE TO RELATED APPLICATIONS

This application is a continuation of U.S. patent application Ser. No. 14/817,354 filed Aug. 4, 2015, now U.S. Pat. No. 9,593,457, which claims priority to U.S. provisional application Ser. No. 62/032,753 filed on Aug. 4, 2014, all the contents of which are herein incorporated by reference in their entirety.

TECHNICAL FIELD

The present invention relates to the field of hydro excavation, and, more particularly, to a system to manufacture native soil flowable fill and related methods.

BACKGROUND

Industrial vacuum equipment has dozens of wet and dry uses such as locating underground utilities (potholing), hydro-excavation, air excavation and vacuum excavation. In addition, the equipment can be used for directional drilling slurry removal, industrial clean-up, waste clean-up, lateral and storm drain clean-out, oil spill clean-up and other natural disaster clean-up applications.

In particular, hydro excavation applications use a combination of high pressure water and suction to dig a hole and vacuum the soil and water into a tank. The hydro excavation equipment may be mounted to a truck or trailer and is typically powered by gas or diesel engines. The native soil that is removed during hydro excavation is typically hauled away for disposal. Dry fill materials are then hauled back to the job site to back fill the hole and are compacted in place. The hauling of the native soil away from the job site and hauling new dry material back to the job site for compaction adds time and costs to the project. Accordingly, what is needed is a system and method to re-use native soils on-site in order to reduce time and costs during construction.

However, in view of the prior art at the time the present invention was made, it was not obvious to those of ordinary skill in the pertinent art how the identified needs could be fulfilled.

SUMMARY

In view of the foregoing background, it is therefore an object of the present invention to provide a method to manufacture a native soil flowable fill. The method includes hydro excavating native soil to form a hole at a first excavation, transferring the native soil from the first excavation to a debris tank, and adding a pozzolan component, cement and water to the debris tank. The method also includes mixing the native soil in the debris tank using a mixing apparatus to form the native soil flowable fill, and transferring the native soil flowable fill back to the first excavation into the hole. The native soil flowable fill comprises 30-90% by weight of native soil, 0-50% by weight of the added pozzolan component, 0-50% by weight of the cement, and 10-45% by weight of the water.

In another embodiment, a system to manufacture a native soil flowable fill includes a debris tank configured to be coupled to a suction hose and to store native soil vacuumed from a first location, and a mixing apparatus inside the debris tank configured to mix the native soil with additional components to form a native soil flowable fill. The mixing apparatus includes a plurality of paddles mounted about a horizontal axle for mixing, where each paddle of the plurality of paddles includes an elongated portion extending away and perpendicular to the horizontal axle and having a flange at each respective distal end.

DETAILED DESCRIPTION

Figures 1, 2:
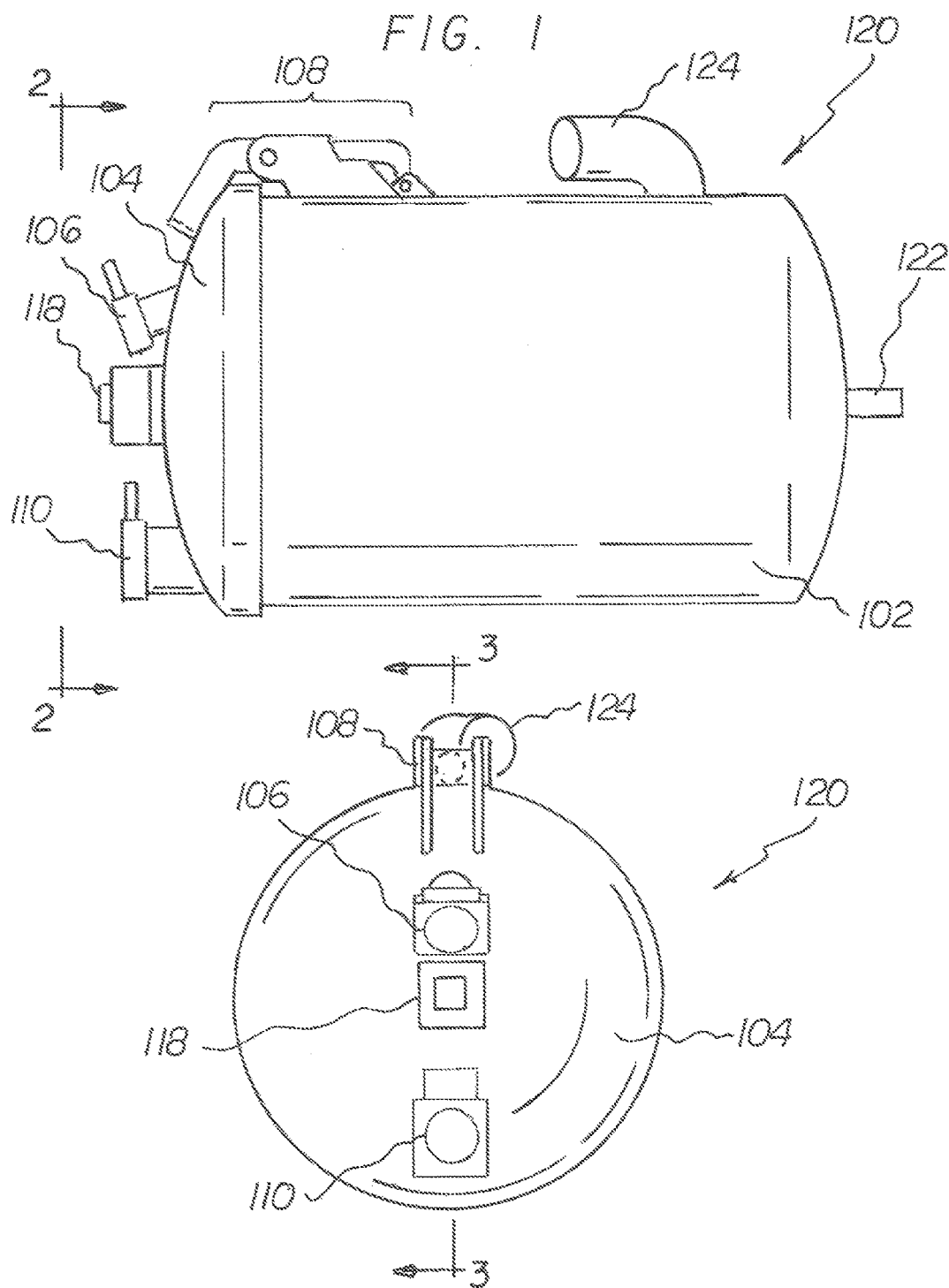
FIG. 1 is an elevational view of a debris tank that may be used to mix the native soil flowable fill.
FIG. 2 is a front elevational view taken on line 2-2 of the debris tank shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In a particular exemplary embodiment, the method to manufacture a native soil flowable fill includes hydro excavating native soil to form a hole at a first excavation, transferring the native soil from the first excavation to a debris tank, and adding a pozzolan component, cement and water to the debris tank. The method also includes mixing the native soil in the debris tank using a mixing apparatus to form the native soil flowable fill, and transferring the native soil flowable fill back to the first excavation into the hole. The native soil flowable fill may comprise 30-90% by weight of native soil, 0-50% by weight of the added pozzolan component, 0-50% by weight of the cement, and 10-45% by weight of the water.

As described above, the native soil flowable fill product includes a cement component and an aggregate component of native soils that are mixed with water in a sufficient amount. This provides a cement-based material in a flowable state that can be set in a controlled manner. The flowable fill is self compacting and has a flowable consistency. The homogenous mixing also facilitates control of the set time of the flowable fill product. The flowable fill can be effectively utilized as a fill material in a variety of different applications such as trench backfill, erosion control, pipe bedding, sub-base stabilization, sinkhole fills, confined spaces, and other suitable areas.

The native soil flowable fill is non-corrosive to pipes and poles that may be encased in the flowable fill. The native soil flowable fill may include a cement component, an aggregate of native soils, other aggregates, water, or any combination thereof, in order to control the desired characteristics of the flowable fill. The cement component may include Portland cement and other materials such as kiln dust, fly ash, or other (natural and artificial) pozzolana materials. The additional cement components may be derived from any suitable materials and in any suitable manner. For example, the kiln dust can be derived from the manufacture of Portland cement. The aggregate component is made with the native soils that are excavated on the job site. Additional aggregates may also be added to the flowable fill that can include recycled materials or reclaimed materials, for example. The water component may include potable water, reclaimed water, or water from a naturally occurring water source proximate the job site, such as a pond or stream.

In a particular exemplary embodiment, a chemical agent may also be used to promote fast and effective set characteristics. The chemical agent can include any suitable type of material.

The cement and aggregate components of the present invention are mixed and further processed in a sufficient amount of water such that the desired mechanical properties, strength properties and the like can be achieved. The cement and aggregate components once processed form a liquid and flowable state. After a desired period of time, the flowable state can set to a settable state in a controlled manner. The native soil flowable fill is self compacting and may be used as a backfill or structural fill in lieu of compacted fill. The set product may be readily excavated with conventional hand-held digging tools.

In a particular exemplary embodiment, the aggregate component includes native soil that is excavated to form a trench, for example. The native soil is transferred from the first excavation to a debris tank. Typically, a vacuum pump is used to provide suction to a hose in order to transfer the native soil to the debris tank. If high pressure water is used in the excavation (i.e., hydro excavation), then both the water remaining from performing the excavation and the native soil are vacuumed up under suction. Once the native soil (and water) are in the debris tank, a pozzolan component, cement and additional water may be added to the debris tank and mixed together to form the native soil flowable fill, which may then be transferred back to the first excavation and into the trench, for example.

The native soil flowable fill may include 30-90% by weight of native soil, 0-50% by weight of the added pozzolan component, 0-50% by weight of the cement, and 10-45% by weight of the water, in a particular embodiment. In addition, an amount, by weight, of the added pozzolan component added to the native soil flowable fill may be a function of an amount, by weight, of siliceous material present in the native soil when transferred to the mixing tank. For example, in some geographic areas, natural pozzolanas (e.g., siliceous material) may be present in the native soil. Accordingly, less of an additional pozzolan component is required for the flowable fill as the native soil contains material that acts as a natural pozzolan.

Alternatively, more additional pozzolan component may be required where there may be little to no natural pozzolan present in the native soil. Similarly, the amount, by weight, of the cement added to the native soil flowable fill may be a function of an amount, by weight, of sand present in the native soil per volume when transferred to the mixing tank. Thus, more sand that is present in the native soil, the less cement that is required for the native soil flowable fill, and the less sand present in the native soil may require more cement for the native soil flowable fill, Also, an amount, by weight, of the water added to the native soil flowable fill may be a function of an amount, by weight, of water present with the native soil when transferred to the debris tank. In particular, when the hydro excavation of the native soil includes using pressurized water to dislodge the native soil, then less additional water is required to be added for the native soil flowable fill. The hydro excavation is performed using a vacuum hose with suction to excavate the native soil and the water (e.g., a slurry) from the trench to the debris tank. When the excavating is performed without pressurized water, then more water is required to be added to form the native soil flowable fill.

If the fill is desired to be considered dry, then additional dry material of up to 49 percent can be added (e.g., soil) to the mixing tank. The additional dry material increases the surface area causing the native soil flowable fill to dry out, which then can be added back to the excavation hole and compacted.

Further, the first excavation may be defined by a geographic physical area where the native soil has the substantially same amount of the pozzolan component by weight, per volume of native soil. For example, the native soil flowable fill may be used throughout the same geographical area where the pozzolan component is substantially the same. However, the native soil flowable fill is preferably not transported to a second area where the pozzolan component, by weight, per volume of native soil, is substantially different from the area of the first excavation.

Referring now to FIGS. 1 and 2, in a particular exemplary embodiment of the system to produce native soil flowable fill, a debris tank 120 includes a cylindrical wall 102 with a door 104. The door 104 may be hingedly connected to the debris tank 120 and opened using a hydraulic latch system 108. An inlet port 106 is disposed proximate an upper portion of the door 104 and used to connect to a hydro excavation hose. An outlet port 110 is disposed proximate a lower portion of the door 104 and used to discharge the contents of the debris tank 120. A vacuum port 124 is used to provide suction to the debris tank 120 from a pump (not shown), which in turn provides suction to the hydro excavation hose used for excavating.

A motor 118 may be disposed at a center of the door 104 and used to rotate a mixing apparatus 112 inside the debris tank 120. An axle support 122 may be disposed on an opposing end of the debris tank 120 from the door 104 and used to support the mixing apparatus within the debris tank 120.

The hydraulic latch system 108 may include a hydraulic ram disposed on an upper side of the debris tank 120 and the hydraulic ram may be used to rotate the door 104 upwards to open the debris tank 120.

Figure 3:
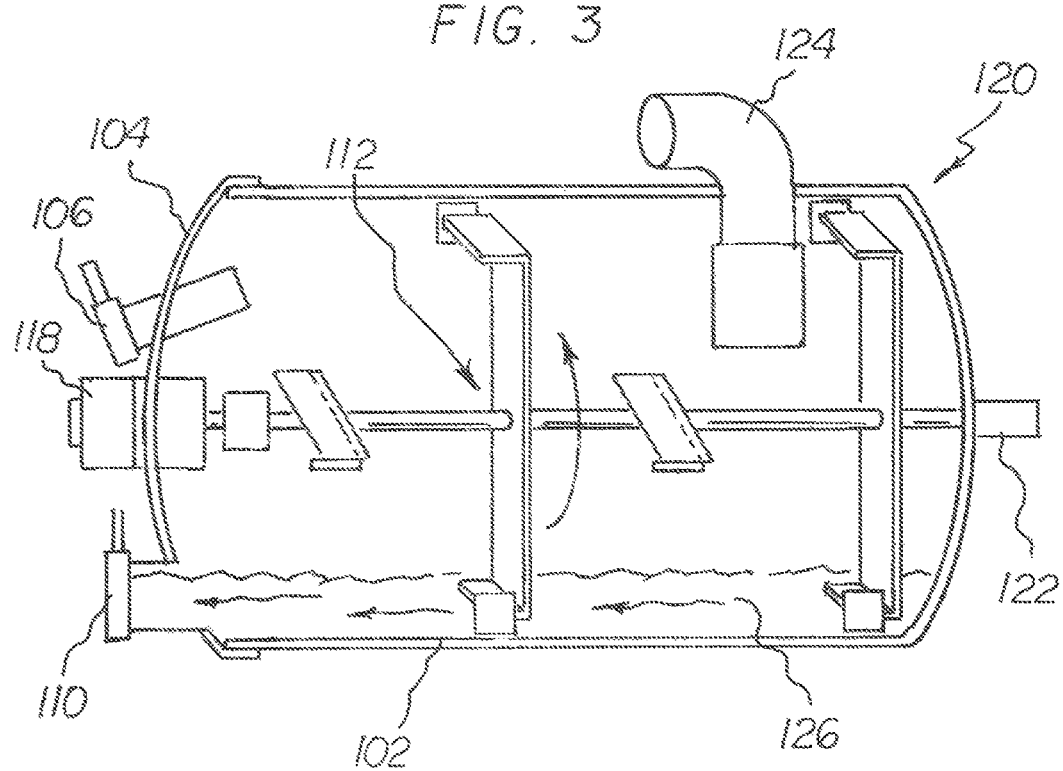
FIG. 3 is a sectional view taken on line 3-3 of FIG. 2 of the debris tank, showing the mixing paddles.
Figure 4:
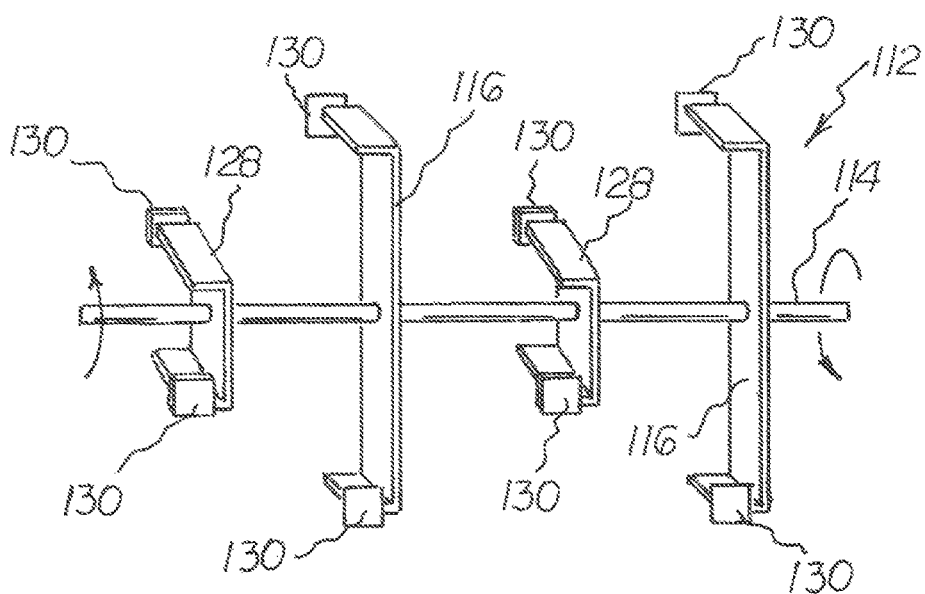
FIG. 4 is a perspective view of the mixing paddles shown in FIG. 3.

Referring now to FIGS. 3 and 4, the mixing apparatus 112 is shown. In a particular exemplary embodiment, a plurality of mixing paddles 116, 128 are mounted to a center axle 114 within the debris tank 120 and are positioned from a front to rear of the debris tank 120. The mixing paddles 116, 128 rotate inside the mixing tank 120 to mix the cement, native soil, pozzolan component, and water to form the native soil flowable fill 126. The spacing and distribution of the mixing paddles 116, 128 within the mixing tank 120 enables the flowable fill to be thoroughly mixed. Accordingly, the mixing apparatus 112 may be integrated directly into the debris tank 112 in a horizontal (or vertical) configuration, for example.

The mixing paddles 116, 128 may be of different sizes. For example, a first mixing paddle 116 may extend to the cylindrical wall 102 of the debris tank 120, while a second mixing paddle 128 is shorter and is configured to mix closer to the center axle 114. Accordingly, as the mixing paddles 116, 128 rotate within the debris tank 120, the native soil flowable fill 126 is thoroughly mixed. In addition, a flange may be mounted to at least one end of the mixing paddles 116, 128 to further increase the mixing of the native soil flowable fill and its consistency. The flange 130 is preferably relatively perpendicular to the respective mixing paddle 116, 128, or may be another orientation.

The previous description of the disclosed embodiments is provided to enable any person skilled in the art to make or use the disclosed embodiments. A particular advantage of the method and system to manufacture the native soil flowable fill, is that the soil that is excavated is also used to manufacture the flowable fill that is used as the fill at the same location. Accordingly, the characteristics of the native soil flowable fill will be more compatible to the surrounding environment of the excavation location.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method to manufacture a native soil flowable fill, the method comprising:
   hydro excavating native soil to form a hole at a first excavation;
   transferring the native soil from the first excavation to a debris tank;
   adding a pozzolan component, cement and water to the debris tank;
   mixing the native soil in the debris tank using a mixing apparatus to form a liquid comprising the native soil flowable fill; and
   transferring the native soil flowable fill back to the first excavation into the hole;
   wherein the liquid comprising the native soil flowable fill comprises a flowable state when transferring into the hole and after a desired period of time, the flowable state sets to a settable state.

2. The method of claim 1, wherein the native soil flowable fill comprises 30-90% by weight of native soil, 0-50% by weight of the added pozzolan component, 0-50% by weight of the cement, and 10-45% by weight of the water.

3. The method of claim 1, wherein an amount, by weight, of the added pozzolan component added to the native soil flowable fill comprises a function of an amount, by weight, of siliceous material present in the native soil when transferred to the debris tank.

4. The method of claim 1, wherein an amount, by weight, of the water added to the native soil flowable fill is a function of an amount, by weight, of water present with the native soil when transferred to the mixing tank.

5. The method of claim 1, further comprising:
   using pressurized water to dislodge the native soil; and
   using a vacuum hose with suction to excavate the native soil and the water from the first excavation to the debris tank.

6. The method of claim 1, wherein the first excavation is defined by a geographic physical area where the native soil has the substantially same amount of the pozzolan component by weight, per volume of native soil.

7. A method to manufacture a native soil flowable fill, the method comprising:
   removing native soil from a first excavation;
   transferring the native soil from the first location directly to a debris tank;
   adding a pozzolan component, cement and water to the debris tank;
   mixing the native soil in the debris tank with the added pozzolan component, cement, and water to form a liquid comprising the native soil flowable fill using a horizontal mixing apparatus;
   transferring the native soil flowable fill from the debris tank to the excavation; and
   filling the first excavation with the native soil flowable fill;
   wherein the liquid comprising the native soil flowable fill comprises a flowable state when filling the first excavation, and after a desired period of time, the flowable state sets to a settable state.

8. The method of claim 7, wherein an amount, by weight, of the added pozzolan component added to the native soil flowable fill comprises a function of an amount, by weight, of siliceous material present in the native soil when transferred to the mixing tank.

9. The method of claim 7, wherein an amount, by weight, of the water added to the native soil flowable fill is a function of an amount, by weight, of water present with the native soil when transferred to the mixing tank.

10. The method of claim 7, wherein the pozzolan component comprises fly ash.

11. The method of claim 7, wherein the pozzolan component comprises a natural pozzolana material.

12. The method of claim 7, wherein an amount, by weight, of the cement added to the native soil flowable fill comprises a function of an amount, by weight, of sand present in the native soil when transferred to the debris tank.

* * * * *